No. 751,621. PATENTED FEB. 9, 1904.
G. ELMASIAN.
DEVICE FOR MEASURING AND TRUING TIPS OF SHOES.
APPLICATION FILED OCT. 2, 1903.
NO MODEL. 2 SHEETS—SHEET 1.

Witnesses:
Jas. C. Wobensmith
Thomas M. Smith

Inventor:
Garabed Elmasian,
By J. Walter Douglass
Attorneys

No. 751,621. PATENTED FEB. 9, 1904.
G. ELMASIAN.
DEVICE FOR MEASURING AND TRUING TIPS OF SHOES.
APPLICATION FILED OCT. 2, 1903.
NO MODEL. 2 SHEETS—SHEET 2.
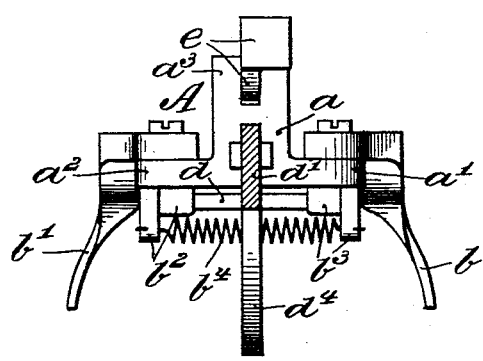
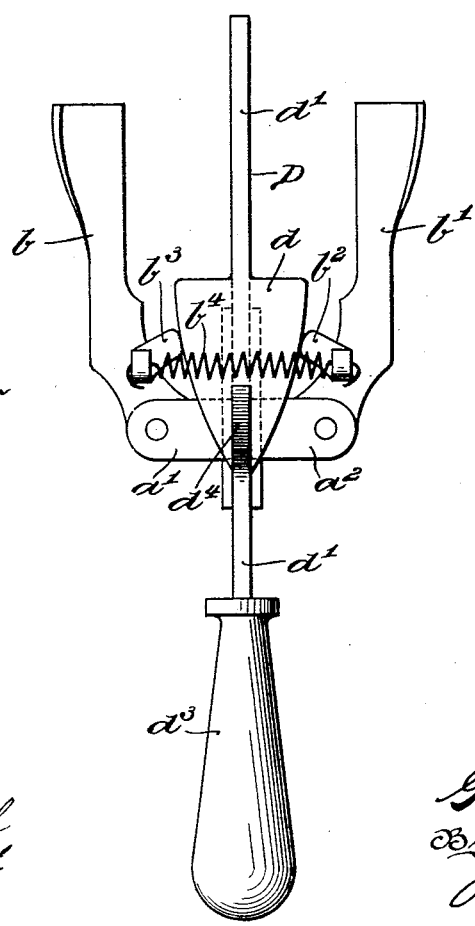

No. 751,621. Patented February 9, 1904.

UNITED STATES PATENT OFFICE.

GARABAD ELMASIAN, OF PHILADELPHIA, PENNSYLVANIA.

DEVICE FOR MEASURING AND TRUING TIPS OF SHOES.

SPECIFICATION forming part of Letters Patent No. 751,621, dated February 9, 1904.

Application filed October 2, 1903. Serial No. 175,455. (No model.)

*To all whom it may concern:*

Be it known that I, GARABAD ELMASIAN, a citizen of the United States, residing at the city of Philadelphia, in the county of Philadelphia and State of Pennsylvania, have invented certain new and useful Improvements in Devices for Measuring and Truing Tips of Shoes, of which the following is a specification.

My invention has relation to a device for measuring and truing or alining the tips of shoes after preferably lasting of the sole to the upper and before final sewing or pegging of the shoe, and in such connection my invention relates to the construction and arrangement of such a device for the said purposes.

The principal objects of my present invention are: first, to provide a device for readily and quickly measuring the size or length as well as for truing or alining the shoe-tip to the upper of the shoe; second, to provide a handy device of the character described adapted to not only permit of the ready and quick measuring of the length or size of a shoe-tip applied to the upper of a shoe, but also to ascertain whether such tip occupies its true position or alinement with respect to the upper about the toe portion of the shoe after lasting and final pegging or sewing of the upper to the sole of the shoe, and, third, to provide a device of the character described in which differences in the size of the tips of shoes may be readily and quickly ascertained and at the same time the true position or alinement of the tip on the shoe-upper determined.

My invention, stated in general terms, consists of a device for measuring and truing or alining the tips of shoes to the uppers thereof constructed and arranged in substantially the manner hereinafter described and claimed.

The nature and characteristic features of my invention will be more fully understood from the following description taken in connection with the accompanying drawings, forming part hereof, in which—

Figure 1:
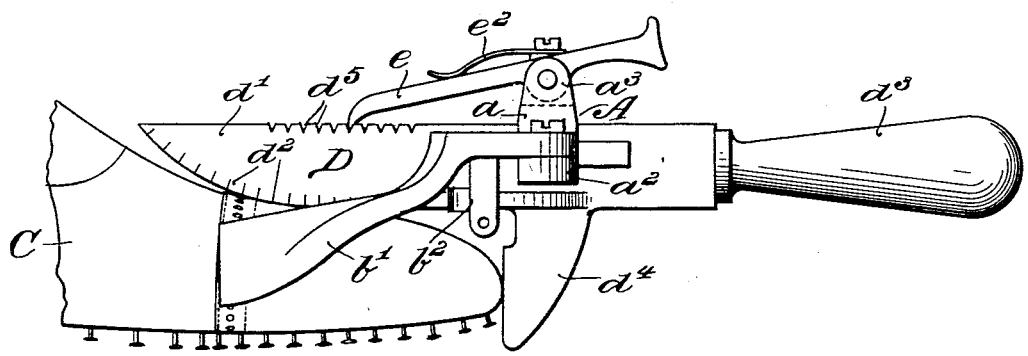
Figure 2:
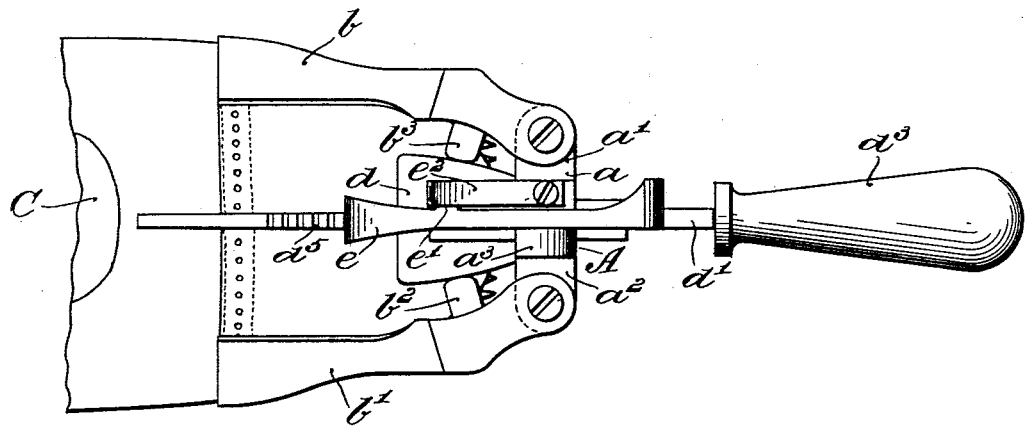

Figure 1 is a side elevational view of a device embodying the particular features of my present invention shown in application to a portion of a shoe, illustrated in broken section to demonstrate the manner of using the device for readily determining the length or size and true portion or alinement of a tip with respect to the shoe-upper. Fig. 2 is a top or plan view of the device of Fig. 1, showing the measuring device with its handle for positioning the device on the tip of the shoe and also the spring-controlled movable truing or alining tip-fingers thereof. Fig. 3 is a rear elevational view of the device, showing the sole-engaging foot and spring-controlled movable truing or alining tip-fingers of the device; and Fig. 4 is an underneath plan view of the movable spring-controlled truing or alining fingers of the device, and the adjustable measuring device with its handle and projecting sole-engaging foot.

Referring to the drawings, the device consists of a slotted and shouldered body $a$, provided with side wings $a'$ and $a^2$, to which wings are pivotally connected fingers $b$ and $b'$, adapted to contour with inner portions of the tip $c$ of the shoe C, so as to permit of the determining thereby at two different points of the shoe-tip upper whether it occupies a true or alined position on the upper from the toe portion in both flaring directions to the rear end of the tip of the shoe-upper.

On the under sides of the fingers $b$ and $b'$ are provided angular or offset lugs $b^2$ and $b^3$, one portion of which lugs engage a spring $b^4$, so as to couple the two fingers together, and the other portion of said lugs are adapted to engage a flaring tongue or cam $d$, formed, preferably, integal with a measuring means D. This means consists of a bar or strip $d'$, graduated on one surface at $d^2$ and preferably curved at the free end thereof, and at the opposite end is provided a handle $d^3$, and projecting from the body portion of the measuring means D is a foot $d^4$ for contacting with or engaging either the toe portion of the tip of the upper of the shoe or the sole of the shoe adjacent to the toe portion of the tip of the shoe in the measuring of the size or length of the tip, as well as in ascertaining the true or alined position of the tip on the upper of the shoe from the toe portion of the tip rearwardly over the shoe-upper.

The upper edge of the measuring device is serrated or toothed at $d^5$, so that a pawl $e$, pivoted to the slotted upper portion of the body $a^3$ of the device A, may be caused to engage between teeth of the edge serrated surface of the measuring bar or strip $d'$ to lock in the required defined position thereby the shiftable measuring bar or strip $d'$ over the tip of the shoe to determine the exact length or size of the tip on the upper of the shoe, as well as to ascertain whether all rear portions of the tip are in required alinement with respect to the shoe-upper. The pivotally-supported pawl $e$ is provided with, preferably, a lug $e'$, arranged on one side of the same, with which engages a flat or other similar type of spring $e^2$ for engaging and thereby holding the pawl $e$ in locking engagement with the serrated or toothed edge surface of the measuring bar or strip $d'$ in the manner and for the purpose hereinbefore explained.

The body of the measuring bar or strip $d'$ is rabbeted to fit complementally the slotted and shouldered body $a$ of the device A, so that either the body $a$ may be slid on the measuring strip or bar $d'$ or the latter slid through the body $a$ of said device for contracting or expanding the fingers $b$ and $b'$ when the device A has been positioned against the shoe-upper to ascertain the required length of the tip on the upper, as well as to determine whether the tip is in its true alined required position with respect to the upper after lasting of the shoe and before final pegging or sewing of the upper to the sole of the shoe, as clearly illustrated in Figs. 1 and 2 of the drawings.

Having thus described the nature and objects of my invention, what I claim as new, and desire to secure by Letters Patent, is—

1. In a device of the character described, a bar provided with a handle, means fixed to said bar having cam portions, spring-controlled fingers connected with said bar and adapted to be actuated by the cam portions of said means, and means adapted to hold said fingers in operative position when actuated by the cam portions of said means, substantially as and for the purposes described.

2. A device of the character described, comprising a graduated bar or strip provided with a handle, fingers adapted to be slid on said bar or strip, and cam means connected with said bar or strip adapted to spread or contract said fingers, substantially as and for the purposes described.

3. In a device of the character described, a bar, a tongue or cam connected with said bar, a block slidably arranged on said bar, fingers pivotally supported by said block and adapted to be engaged by said cam or tongue, and said fingers adapted when shifted longitudinally on said bar to be either spread apart or contracted, substantially as and for the purposes described.

4. A device of the character described, comprising a slotted body having spring-controlled pivotal fingers, a measuring-bar with a tongue, said bar adapted to be slid back and forth in said body to permit the tongue of said measuring-bar to spread or contract said fingers, and means for locking said measuring-bar in required position, substantially as and for the purposes described.

5. A device of the character described, comprising a slotted and shouldered body having spring-controlled movable fingers, a measuring-bar with a tongue or cam and foot, and means for locking said bar in required position, substantially as and for the purposes described.

6. A device of the character described, comprising a slotted and shouldered body having side wings provided with spring-controlled movable fingers, measuring means having a rabbeted body with a tongue or cam and foot, and pawl-actuating means for locking said measuring means in required position, substantially as and for the purposes described.

7. A device of the character described, comprising a slotted body having movable spring-controlled fingers provided with lugs and a measuring means provided with a flaring tongue and foot, said means adapted to be slid in said slotted body, substantially as and for the purposes described.

8. A device of the character described, comprising a slotted body having movable fingers, a measuring means provided with a flaring tongue, foot and serrated edge and a spring-controlled pawl adapted to engage the serrated edge of said means, substantially as and for the purposes described.

9. A device of the character described, comprising a slotted and shouldered body having movable spring-controlled fingers, measuring means provided with a rabbeted body having a serrated upper edge, a flaring tongue and a projecting foot, said means adapted to be slid in said slotted and shouldered body of the device, and a pawl adapted to engage the serrated edge of said measuring means, substantially as and for the purposes described.

In testimony whereof I have hereunto set my signature in the presence of two subscribing witnesses.

GARABAD ELMASIAN.

Witnesses:
J. WALTER DOUGLASS,
THOMAS M. SMITH.